Patented Nov. 7, 1933

1,933,985

UNITED STATES PATENT OFFICE 1,933,985

SULFAMIC ACIDS OF SECONDARY BASES, PROCESSES OF PREPARING THE SAME, AND PURE SECONDARY BASES DERIVED THEREFROM

Georg Kränzlein and Heinrich Greune, Hochst-on-the-Main, Max Thiele, Frankfort-on-the-Main, and Fritz Helwert, Mannheim, Germany, assignors to General Aniline Works, Inc., a corporation of Delaware No Drawing. Application July 25, 1927, Serial No. 208,405, and in Germany July 31, 1926

22 Claims. (Cl. 260—128)

Our invention relates to sulfamic acids of secondary bases, processes of preparing the same and pure secondary bases derived therefrom.

We have found that sulfamic acids of secondary bases are obtainable in excellent purity and with a good yield by causing chlorosulfonic acid to act upon a preparation containing a secondary base, an acid-binding agent, and preferably an indifferent solvent or diluent which may at the same time be of a basic character. Chlorsulfonates, esters of chlorosulfonic acid, sulfur trioxide, pyrosulfuric acid or the like, act in the same manner as chlorosulfonic acid itself. This mode of manufacture could not be anticipated because by the action of chlorosulfonic acid in a diluent or solvent in the absence of an acid-binding agent upon a secondary base, for instance carbazole, there is obtained a carbazole-monosulfonic acid in which the sulfonic acid group is linked to a carbon atom, not to a nitrogen atom.

The said sulfonic acids of secondary bases, when treated under suitable conditions, for instance on being heated with an acid, lose the sulfonic acid group and revert to the free bases. This result also could not be foreseen, because the secondary bases substituted at the nitrogen atom, for instance the nitroso-compounds of diphenyl-amine or carbazole, when heated with an acid are often transformed into the corresponding secondary bases substituted at the carbon atom.

By the combined application of the two processes it is possible to isolate secondary bases in a pure state from mixtures containing them by way of their water-soluble sulfamic acids. Thus carbazole can be isolated in a simple manner and in a pure state, for instance from crude anthracene; or a mixture of mono- and di-methylaniline can be separated into its constituents.

The following examples illustrate the invention, the parts being by weight:—

(1) Into a mixture of 107 parts of monomethylaniline and 500 parts of anhydrous pyridine are introduced drop by drop at about 30-35° C., while cooling and well stirring, 160 parts of chlorosulfonic acid and the whole is heated for some hours to 50-60° C. The liquid thus produced is introduced into a solution of 220 parts of sodium carbonate in 2 litres of water and the pyridine is removed by passing steam through the mixture. From the remaining solution the sodium monomethylaniline sulfamate is isolated in the form of colorless laminæ by adding common salt. The product is a readily soluble body which when its aqueous solution is heated with a diluted mineral acid, loses the sulfonic acid group and reverts to monomethylaniline which can be easily separated from the acid solution by adding an alkali.

(2) 107 parts of mono-methylaniline are dissolved in 300 parts of anhydrous synthetic collidine; to this solution is added by portions at 10-15° C. while well stirring, a mixture of 200 parts of oleum containing 60 per cent. of SO₃ and 800 parts of anhydrous collidine; the whole is then stirred for some time at 10-15° C. and introduced into an excess of a solution of sodium carbonate. After the collidine has been removed by steam, the sulfamic acid may be separated, as sodium salt forming colorless laminæ, by the addition of common salt or a strong caustic soda solution.

(3) 167 parts of carbazole are dissolved in 1000 parts of anhydrous pyridine and there are then added by drops, at approximately 30° C. 167 parts of chlorosulfonic acid. After the chlorosulfonic acid has been introduced, the mass is stirred for some hours at 50-60° C. and then introduced into an excess of a solution of sodium carbonate and the pyridine removed by steam. On filtering the alkaline liquor which is left after the treatment with steam, the sulfamic acid of the carbazole of the following formula:

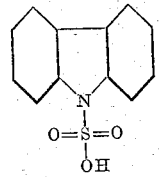

is separated, as its sodium salt, forming colorless laminæ, by salting it out from the sufficiently concentrated filtrate. This sulfamic acid is very readily soluble in water and yields when heated with a diluted acid pure carbazole by removal of the sulfonic acid group.

(4) Into a solution of 169 parts of diphenyl-amine in 500 parts of anhydrous pyridine is introduced a mixture of 300 parts of chlorosulfonic acid and 800 parts of dry pyridine and the whole is heated to about 50° C. until the formation of the sulfamic acid is complete. After the reaction mixture has been introduced into an excess of sodium carbonate solution the pyridine is removed by steam and from the residual alkaline aqueous solution the sulfamic acid is separated in the form of sodium salt by adding common salt. This sodium salt crystallizes in the form of colorless laminæ; in water it is very readily soluble and when heated with a diluted acid it is split up into sulfuric acid and diphenylamine, which latter may easily be isolated from the acid solution by means of an alkali.

(5) 100 parts of crude anthracene, containing 48 per cent. of pure anthracene, are made into a suspension with 150 parts of dimethylaniline. The mixture is introduced into a mixture, cooled to 10° C., of 250 parts of mono-chlorobenzene, 70 parts of dimethylaniline and 55 parts of chlorosulfonic acid. During this operation the temperature rises to about 25° C. The mass is stirred for two hours at 20–25° C. and then poured into a cold solution of sodium carbonate, the percentage of which must be so proportioned that the solution remains alkaline. The dimethylaniline and monochlorobenzene are then removed by steam and the anthracene and other constituents of the crude anthracene are filtered, while hot, from the mass remaining after the steaming operation. The filtrate can be worked up in different ways. For instance, the impurities contained in the filtrate may be removed by shaking with animal charcoal, whereupon the mass is filtered and the N-sulfonic acid separated by adding common salt; or there may be added to the purified solution of the N-sulfonic acid a mineral acid and the mass heated to 80° C. until no more carbazole separates. The carbazole so obtained crystallizes in the form of laminæ, exhibits in ultraviolet light an intense bluish-violet fluorescence and melts at 237–238° C.

Instead of chlorosulfonic acid there may be used in this example a corresponding quantity of sodium chlorosulfonate or chlorosulfonic acid ester or sulfur trioxide.

(6) 100 parts of the mass remaining after the purification of the anthracene, which is preferably effected by a previous treatment with a solvent of low boiling point, for instance chlorobenzene, or by sublimation, are suspended in 150 parts of dimethylaniline and the whole is introduced into a mixture, cooled to 0° C., of 250 parts of chlorobenzene, 140 parts of dimethylaniline and 110 parts of chlorosulfonic acid, care being taken that during this operation the temperature does not rise above 10° C.; the mass is then stirred for 3 hours at 10–15° C.

If in this example calcium oxide is used instead of sodium carbonate, there will remain, after the mass has been steamed to remove dimethylaniline and monochlorobenzene, the calcium sulfate which has been formed and excess of calcium oxide together with the anthracene and impurities; the mixture is filtered and worked up as described in Example 5.

(7) Into 300 parts of a mixture composed of about 100 parts of monomethylaniline and 200 parts of dimethylaniline are slowly introduced drop by drop at a temperature not exceeding 10–15° C., while cooling and well stirring, a mixture consisting of about 130 parts of chlorosulfonic acid and 600 parts of dimethylaniline and the whole is then stirred further at 10–15° C. until the formation of the sulfamic acid is complete. The mass is then poured into an excess of a sodium carbonate solution, the dimethylaniline is removed by steam and from the remaining alkaline solution the sodium salt of the sulfamic acid of monomethylaniline may be salted out, or the free base as such may be separated by heating the alkaline solution with excess of diluted sulfuric acid and subsequent addition of an excess of alkali.

We claim:

1. The process which comprises causing chlorosulfonic acid to act upon a preparation containing an aromatic secondary base in the presence of an aromatic tertiary base, purifying the sulfamic acid thus obtained and decomposing the acid so as to reproduce the base.

2. The process which comprises causing chlorosulfonic acid to act upon a preparation containing an aromatic secondary base in the presence of an aromatic tertiary base and of a diluent, purifying the sulfamic acid thus obtained and decomposing the acid so as to reproduce the base.

3. The process which comprises causing chlorosulfonic acid to act upon a preparation containing an aromatic secondary base in the presence of an aromatic tertiary base and of a diluent, whereby the secondary base is converted into sulfamic acid, treating the reaction mixture with aqueous alkali to convert the sulfamic acid into a stable salt, purifying the latter and separating it from the tertiary base, and decomposing the sulfamic acid by treatment with acid so as to recover the secondary base.

4. The process which comprises causing chlorosulfonic acid to act upon a dry preparation containing carbazole in the presence of an aromatic tertiary base, purifying the sulfamic acid thus obtained and decomposing the acid so as to reproduce the base.

5. The process which comprises causing chlorosulfonic acid to act upon a dry preparation containing carbazole in the presence of an aromatic tertiary base and of a diluent, purifying the sulfamic acid thus obtained and decomposing the acid so as to reproduce the base.

6. The process which comprises causing chlorosulfonic acid to act upon a dry preparation containing carbazole in the presence of an aromatic tertiary base, whereby the carbazole is converted into sulfamic acid, treating the reaction mixture with aqueous alkali to convert the sulfamic acid into a stable salt, purifying the latter and separating it from the tertiary base, and decomposing the sulfamic acid by treatment with acid so as to recover the carbazole.

7. The process which comprises causing chlorosulfonic acid to act upon a dry preparation containing carbazole in the presence of an aromatic tertiary base and of a diluent, whereby the carbazole is converted into sulfamic acid, treating the reaction mixture with aqueous alkali to convert the sulfamic acid into a stable salt, purifying the latter and separating it from the tertiary base, and decomposing the sulfamic acid by treatment with acid so as to recover the carbazole.

8. The process which comprises causing chlorosulfonic acid to act upon a dry preparation containing carbazole in the presence of pyridine, purifying the sulfamic acid thus obtained and decomposing the acid so as to reproduce the base.

9. The process which comprises causing chlorosulfonic acid to act upon a dry preparation containing carbazole in the presence of pyridine and of a diluent, purifying the sulfamic acid thus obtained and decomposing the acid so as to reproduce the base.

10. The process which comprises causing chlorosulfonic acid to act upon a dry preparation containing carbazole in the presence of pyridine, whereby the carbazole is converted into the sulfamic acid, treating the reaction mixture with aqueous alkali to convert the sulfamic acid into a stable salt, purifying the latter and separating it from the pyridine, and decomposing the sulfamic acid by treatment with acid so as to recover the carbazole.

11. In a process of preparing pure secondary bases the steps consisting in causing chlorosulfonic acid to act upon a dry preparation containing carbazole in the presence of pyridine and of a diluent, whereby the carbazole is converted into the sulfamic acid, treating the reaction mixture with aqueous alkali to convert the sulfamic acid into a stable salt, purifying the latter and separating it from the pyridine, and decomposing the sulfamic acid by treatment with acid so as to recover the carbazole.

12. The carbazole sulfamic acid of the following formula:

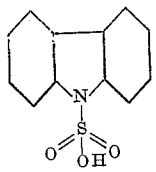

being a colorless product soluble in water and yielding carbazole when heated in the presence of a diluted mineral acid.

13. The process which comprises causing a compound of the group consisting of chlorosulfonic acid, chlorsulfonates, chlorsulfonic acid esters, sulfur trioxide and pyrosulfuric acid to act upon a dry preparation containing an aromatic secondary base and an aromatic tertiary base, purifying the sulfamic acid thus obtained, and decomposing the acid so as to reproduce the base.

14. The process which comprises causing a compound of the group consisting of chlorosulfonic acid, chlorsulfonates, chlorsulfonic acid esters, sulfur trioxide and pyrosulfuric acid to act upon a dry preparation containing an aromatic secondary base, and an aromatic tertiary base, and a diluent, purifying the sulfamic acid thus obtained, and decomposing the acid so as to reproduce the base.

15. A process of separating mono- and dimethylanilines which consists in treating the dry mixture thereof with chlorosulphonic acid, whereby the secondary amine is converted into a sulphamic acid, treating the product with aqueous alkali to convert the sulphamic acid into a stable salt, recovering the dimethylaniline and hydrolyzing the sulphamic acid by treatment with acid and recovering the monomethyl-aniline.

16. A process of separating mono- and dialkyl arylamines which consists in treating a dry mixture thereof with chlorosulphonic acid, whereby the monoalkyl arylamine is converted into a sulphamic acid, treating the product with aqueous alkali to convert the sulphamic acid into a stable salt, recovering the dialkyl arylamine and hydrolyzing the sulphamic acid by treatment with acid and recovering the monoalkyl arylamine.

17. A process of separating mono- and dialkyl anilines which consists in treating a dry mixture thereof with chlorosulphonic acid, whereby the monoalkyl aniline is converted into a sulphamic acid, treating the product with aqueous alkali to convert the sulphamic acid into a stable salt, recovering the dialkyl aniline and hydrolyzing the sulphamic acid by treatment with acid and recovering the monoalkyl aniline.

18. The process which comprises causing chlorosulphonic acid to act upon a preparation containing a secondary aromatic base in the presence of a tertiary aromatic base, whereby the secondary base is converted into sulfamic acid, treating the reaction mixture with aqueous alkali to convert the sulfamic acid into a stable salt, purifying the latter and separating it from the tertiary base, and decomposing the sulfamic acid by treatment with acid so as to recover the secondary base.

19. The process which comprises causing chlorosulphonic acid to act upon a preparation containing a monoalkyl arylamine in the presence of a dialkyl arylamine.

20. The process which comprises causing chlorosulphonic acid to act upon a preparation containing a monoalkyl aniline in the presence of a dialkyl aniline.

21. The process which comprises causing chlorosulphonic acid to act upon a dry mixture of mono- and di-methyl-anilines.

22. The sulfamic acids of secondary aromatic bases of the general formula:

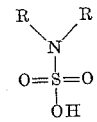

wherein the R's represent unsubstituted aromatic radicals or jointly represent the grouping

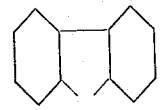

said products forming generally in the form of their sodium salts colorless laminæ and losing the sulfamic acid group when treated with an acid, being reverted thereby to the free bases.

GEORG KRÄNZLEIN.
HEINRICH GREUNE.
MAX THIELE.
FRITZ HELWERT.